(12) United States Patent
Dong (10) Patent No.: US 12,029,198 B1
(45) Date of Patent: Jul. 9, 2024

(54) FOLDING PET BATHTUB

(71) Applicant: Yemei Dong, Huainan Anhui (CN)

(72) Inventor: Yemei Dong, Huainan Anhui (CN)

( * ) Notice: Subject to any disclaimer, the term of this patent is extended or adjusted under 35 U.S.C. 154(b) by 0 days.

(21) Appl. No.: 18/530,289

(22) Filed: Dec. 6, 2023

(51) Int. Cl.
*A01K 13/00* (2006.01)

(52) U.S. Cl.
CPC ................................. *A01K 13/001* (2013.01)

(58) Field of Classification Search
CPC .......... A61D 11/00; A47K 3/17; A47K 3/162; A47K 3/07; A47K 3/06; A47K 13/001; A01K 13/001
See application file for complete search history.

(56) References Cited

U.S. PATENT DOCUMENTS

| | | | |
|---|---|---|---|
| 4,635,305 A * | 1/1987 | Wyss ...................... | A47D 7/002 5/99.1 |
| 4,688,280 A * | 8/1987 | Kohus ................... | A47D 13/066 5/99.1 |
| 5,193,234 A * | 3/1993 | Joaquin .................. | A47D 7/002 5/99.1 |
| 5,358,220 A * | 10/1994 | Yu-Kuang ............. | A47D 13/063 256/25 |
| 5,819,342 A * | 10/1998 | Williams ............. | A47D 13/063 5/98.1 |
| 6,434,768 B2 * | 8/2002 | Brown .................. | E04H 15/006 5/99.1 |
| 7,594,285 B2 * | 9/2009 | Chen ..................... | A47D 13/063 248/167 |
| 9,055,847 B1 * | 6/2015 | Flannery ................ | A47C 4/283 |
| D940,284 S * | 1/2022 | Mu ............................. | D23/277 |
| 2019/0375539 A1 * | 12/2019 | Mu ......................... | B65D 7/26 |
| 2023/0117341 A1 * | 4/2023 | Mu ........................ | A01K 1/035 119/600 |

* cited by examiner

*Primary Examiner* — Ebony E Evans
(74) *Attorney, Agent, or Firm* — Vladimir Postnikov (57) ABSTRACT

A folding pet bathtub is disclosed, including a foldable support frame and a flexible bathtub provided on the foldable support frame. The foldable support frame includes a support component, a first bracket component and a second bracket component that are foldable and disposed sequentially from top to bottom on an inside of the support component, two sets of linkage components for connecting the first bracket component and the second bracket component, and a locking device disposed on the linkage components for preventing the first bracket component and the second bracket component to be folded. By setting linkage components to drive the first bracket component and the second bracket component to unfold or fold, the folding pet bathtub is not only convenient for daily unfolding use, but also is folded when not in use, which can reduce volume of the bathtub, the structure is simple and convenient to use.

3 Claims, 9 Drawing Sheets

FOLDING PET BATHTUB

TECHNICAL FIELD

The present application relate to the technical field of pet supplies, and specifically to a folding pet bathtub.

BACKGROUND

With continuous improvement of people's living standards, pets are becoming more and more important to families, there are more and more types of pet supplies, and cleaning devices for pets are one of important pet supplies.

However, at present, conventional pet bath basins are of one-piece construction, occupying a large volume, which is not only inconvenient for storage, but also inconvenient for portable use.

SUMMARY

The present disclosure aims to provide a novelty folding pet bathtub to address above problems.

In some embodiments of the present disclosure, a folding pet bathtub is provided, including a foldable support frame and a flexible bathtub provided on the foldable support frame.

In some embodiments of the present disclosure, the foldable support frame includes a support component, a first bracket component and a second bracket component that are foldable and disposed sequentially from top to bottom on an inside of the support component, two sets of linkage components for connecting the first bracket component and the second bracket component, and a locking device disposed on the linkage components for preventing the first bracket component and the second bracket component to be folded.

In some preferred embodiments of the present disclosure, the folding pet bathtub further includes a shelf provided on the foldable support frame and located below the flexible bathtub.

In some preferred embodiments of the present disclosure, the support component includes two supporting legs having U-shaped and symmetrically disposed, and two first joint bases for connecting upper ends of the supporting legs. Herein any one of the supporting legs is configured to be rotationally connected to the two joint bases.

In some preferred embodiments of the present disclosure, the first bracket component includes two support borders symmetrically disposed, and two second joint bases disposed on the two support boarders for connecting them. Herein any one of the support borders is configured to be rotationally connected to the second joint bases.

In some preferred embodiments of the present disclosure, the second bracket component includes two supporting seats symmetrically disposed, and two third joint bases for connecting the two supporting seats. Herein any one of the supporting seats is configured to be rotationally connected to the two third joint bases to fold or open the two supporting seats.

In some preferred embodiments of the present disclosure, the linkage components includes two linkage rods having X-shaped after being articulated in middle, a fourth joint bases for connecting upper ends of the two linkage rods to the first bracket component, and a fifth joint bases for connecting lower ends of the two linkage rods to the second bracket component. Herein the upper ends and lower ends of the linkage rods are configured to be rotationally connected to the fourth joint bases and the fifth joint bases, respectively.

In some preferred embodiments of the present disclosure, the locking device includes a locking seat fixedly provided on the linkage components, a locking rod fixedly provided on the first bracket component and slidingly connected with a locking member, a shrapnel with a limit post provided within the locking rod, and a button provided on the locking seat. Herein the locking rod is configured with a limit hole cooperating with the limit post, the shrapnel is disposed within the locking rod, and the limit post is configured to extend outwardly the locking rod via the limit hole.

In some preferred embodiments of the present disclosure, the flexible bathtub is further configured with storage bags on both sides of an upper opening.

In some preferred embodiments of the present disclosure, the flexible bathtub is configured with straps at bottom, and the third joint bases are configured with connectors removably connected to the straps.

In some preferred embodiments of the present disclosure, the supporting legs have a folding structure, the folding structure includes feet having a U-shaped, two supporting rods for rotatably connected to the feet, and a rotation mechanism provided between the feet and the supporting rods. Herein the supporting rods are configured to be folded or opened with the feet by the rotation mechanism.

As can be seen from above description, the present disclosure has at least following advantages. By setting linkage components to drive the first bracket component and the second bracket component to unfold or fold, the folding pet bathtub is not only convenient for daily unfolding use, but also is folded when not in use, which can reduce volume of the bathtub, the structure is simple and convenient to use.

BRIEF DESCRIPTION OF THE DRAWINGS

Accompanying drawings illustrated herein are used to provide a further understanding of the present disclosure and form a part of the present disclosure. Further, all exemplary embodiments of the present disclosure are used to explain the present invention and do not constitute an improper limitation of the present disclosure.

In the drawings, reference signs are as follows. 01. support frame, 02. flexible bathtub, 03. shelf, 10. support component, 11. supporting leg, 12. first joint base, 121. first through hole, 20. first bracket component, 21. support border, 22. second joint base, 30. second bracket component, 31. supporting seat, 32. third joint base, 321. second through hole, 322. connector, 40. linkage component, 41. linkage rod, 42. fourth joint base, 43. fifth joint base, 50. locking device, 51. locking seat, 52. locking rod, 53. shrapnel, 531. limit post, 54. button, 60. storage bag, 70. straps, 80. connecting piece, 81. groove, 90. storage desk, 111. foot, 112. supporting rod, 113. rotation mechanism.

DETAILED DESCRIPTION OF THE EMBODIMENTS

In order to enable a person of ordinary skill in the art to better understand technical solutions of the present disclosure, which will be described clearly and completely in the following in conjunction with the accompanying drawings in the embodiments of the present disclosure. It is obvious that the described embodiments are only a part of the embodiments of the present disclosure and not all of the embodiments. Based on the embodiments in the present disclosure, all other embodiments obtained by the person of ordinary skill in the art without making creative labor shall fall within the scope of protection of the present disclosure.

Referring to FIG. 1 to FIG. 9, in some embodiments of the present disclosure, a folding pet bathtub is provided, including a foldable support frame 01 and a flexible bathtub 02 provided on the foldable support frame. When the support frame 01 is folded, the flexible bathtub 02 can be folded and stored by itself.

Figure 1:
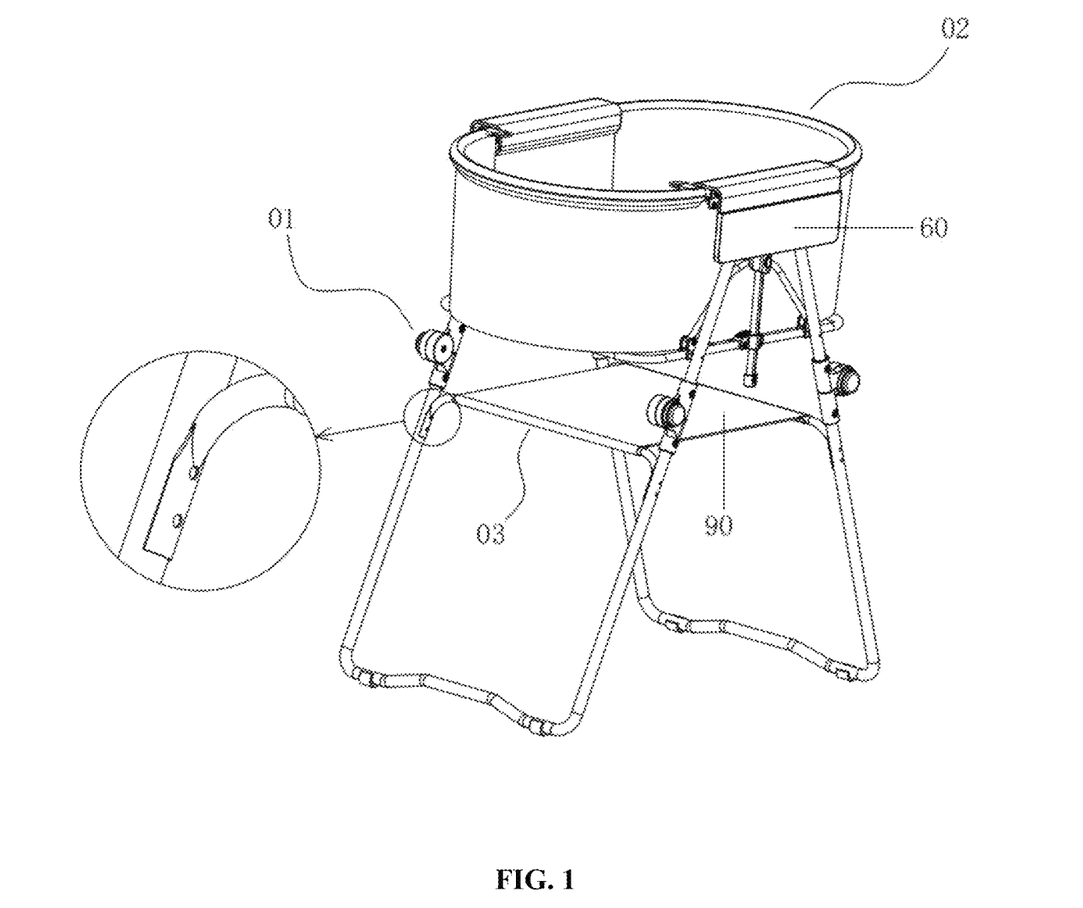
FIG. 1 shows an axial side view of a folding pet bathtub in accordance with some embodiments of the present disclosure.
Figure 2:
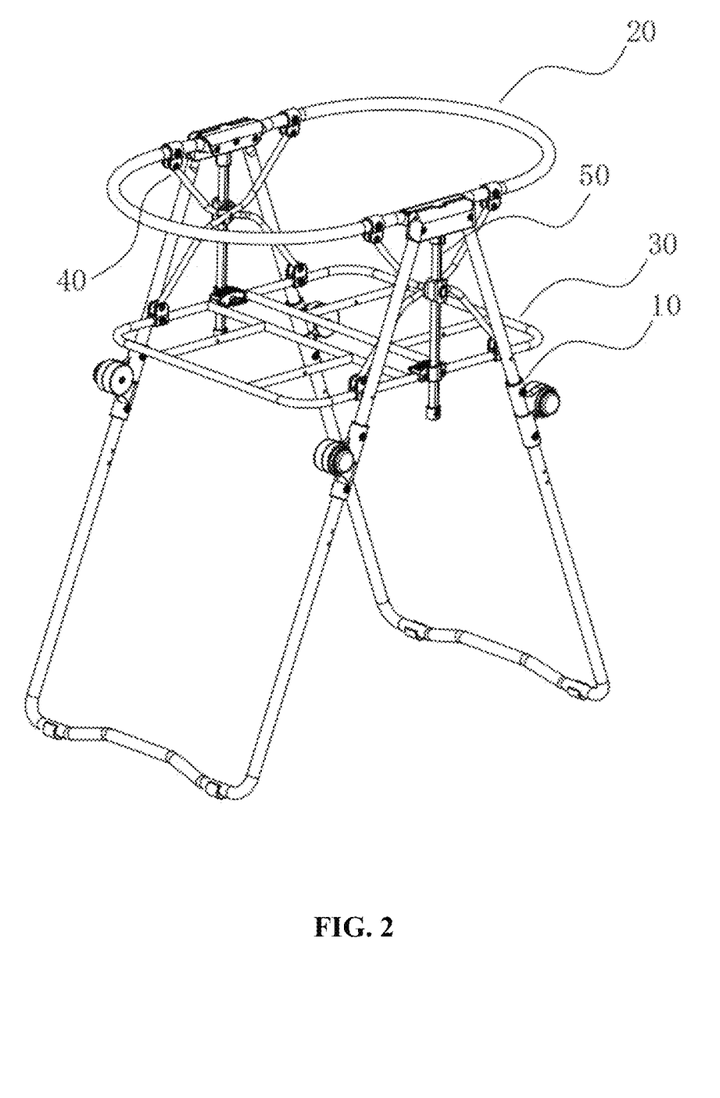
FIG. 2 shows an axial side view of a support frame in accordance with some embodiments of the present disclosure.

The support frame 01 includes a support component 10, a first bracket component 20 and a second bracket component 30 that are foldable and disposed sequentially from top to bottom on an inside of the support component 10, two sets of linkage components 40 for connecting the first bracket component 20 and the second bracket component 30, and a locking device 50 disposed on the linkage components 40 for preventing the first bracket component 20 and the second bracket component 30 to be folded.

Figure 4:
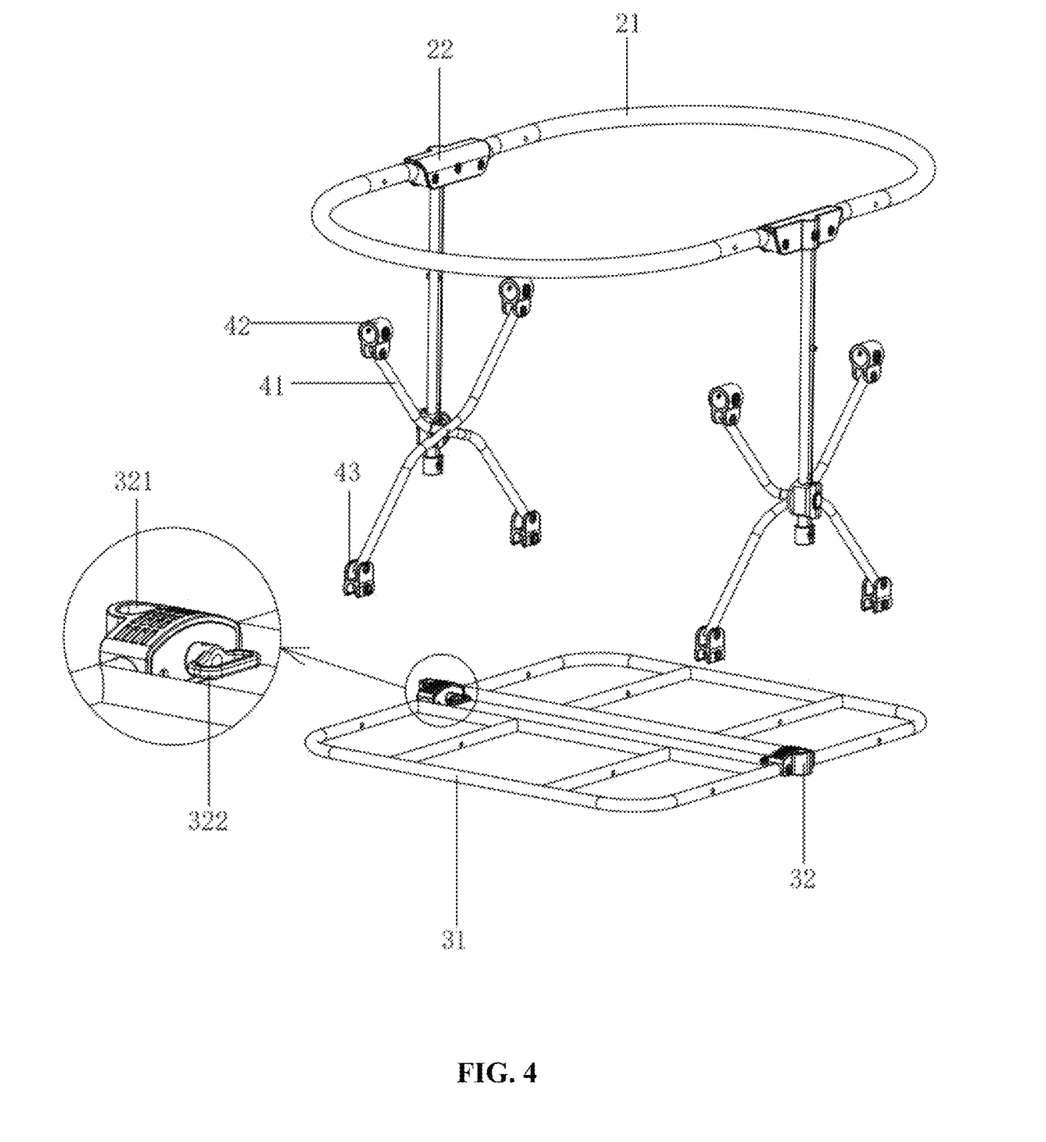
FIG. 4 shows a local exploded view of the folding pet bathtub in accordance with some embodiments of the present disclosure.
Figure 5:
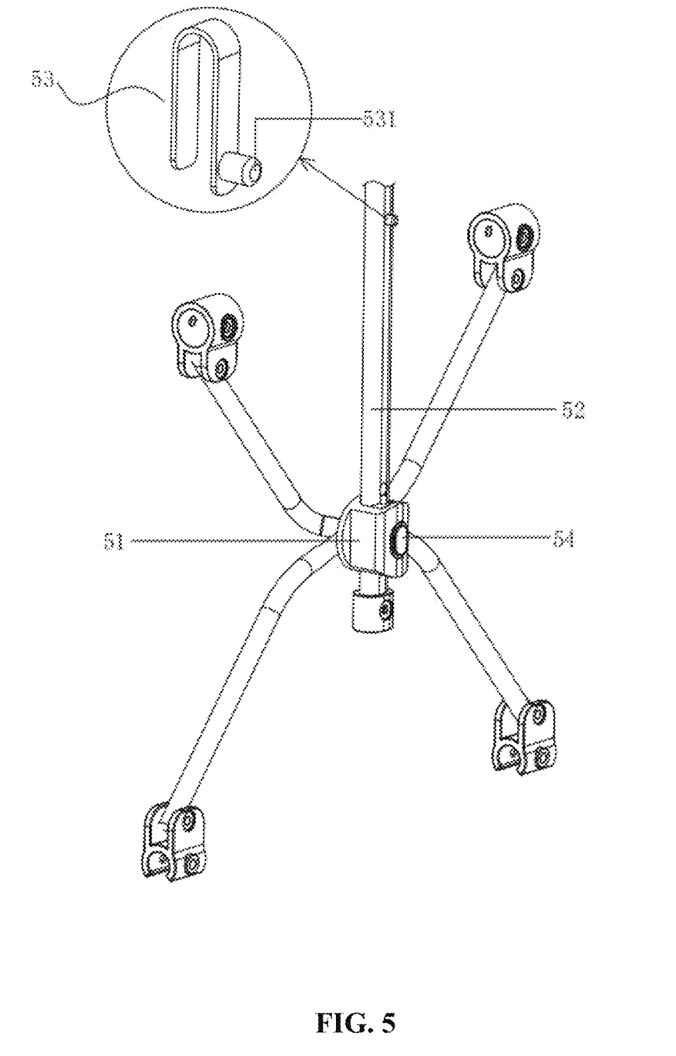
FIG. 5 is a local schematic diagram of FIG. 4.

The locking device 50 includes a locking seat 51 fixedly provided on the linkage components 40, a locking rod 52 fixedly provided on the first bracket component 20 and slidingly connected with a locking member, a shrapnel 53 with a limit post 531 provided within the locking rod 52, and a button 54 provided on the locking seat 51. Herein the locking rod 52 is configured with a limit hole cooperating with the limit post 531, the shrapnel 53 is disposed within the locking rod 52, and the limit post 531 is configured to extend outwardly the locking rod 52 via the limit hole. After the button 54 is pressed, the limit post 531 is compressed into the limit hole to realize unlocking, and above mentioned key unlocking and fixing methods are all existing technologies and will not be discussed in detail.

Figure 7:
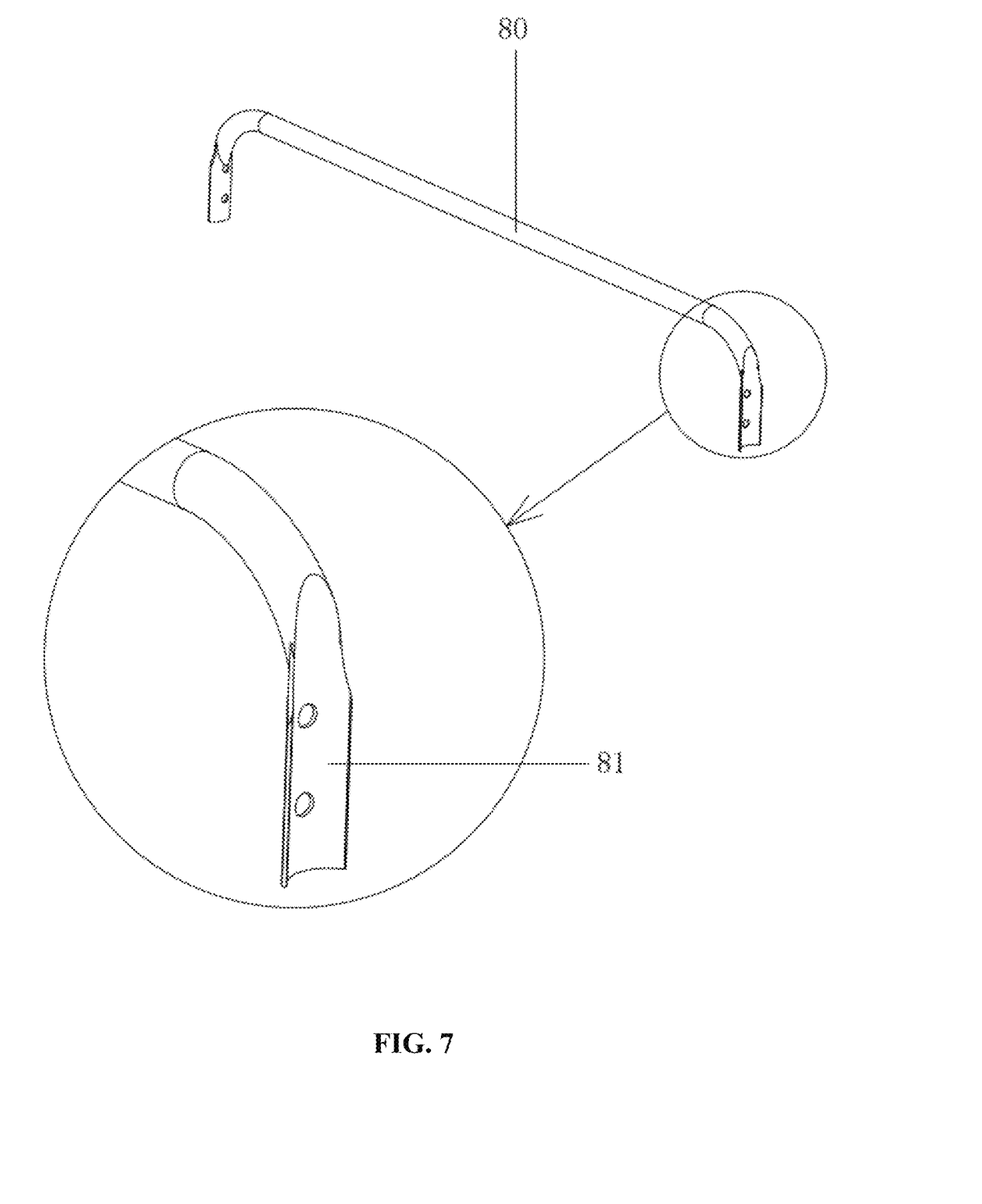
FIG. 7 is an axial side view of an connecting piece in accordance with some embodiments of the present disclosure.

In some preferred embodiments of the present disclosure, the folding pet bathtub further includes a shelf 03 provided on the support frame 01 and located below the flexible bathtub 02. Herein the shelf 03 includes two U-shaped connecting pieces 80, a storage desk 90 with both ends disposed on the two connecting pieces 80. Two ends of the connecting pieces 80 are configured with arc-shaped grooves 81 to match the installation of round tubes, the storage desk 90 is made of fabric, and punching are sewn out at both ends to enable the both ends of the storage desk 90 to be sleeved onto the two connecting pieces 80. Since most of parts in the present disclosure are designed with buttons/keys, the grooves 81 are provided to facilitate cooperation with the round tubes, and after match, it can be locked by a number of bolts.

Figure 3:
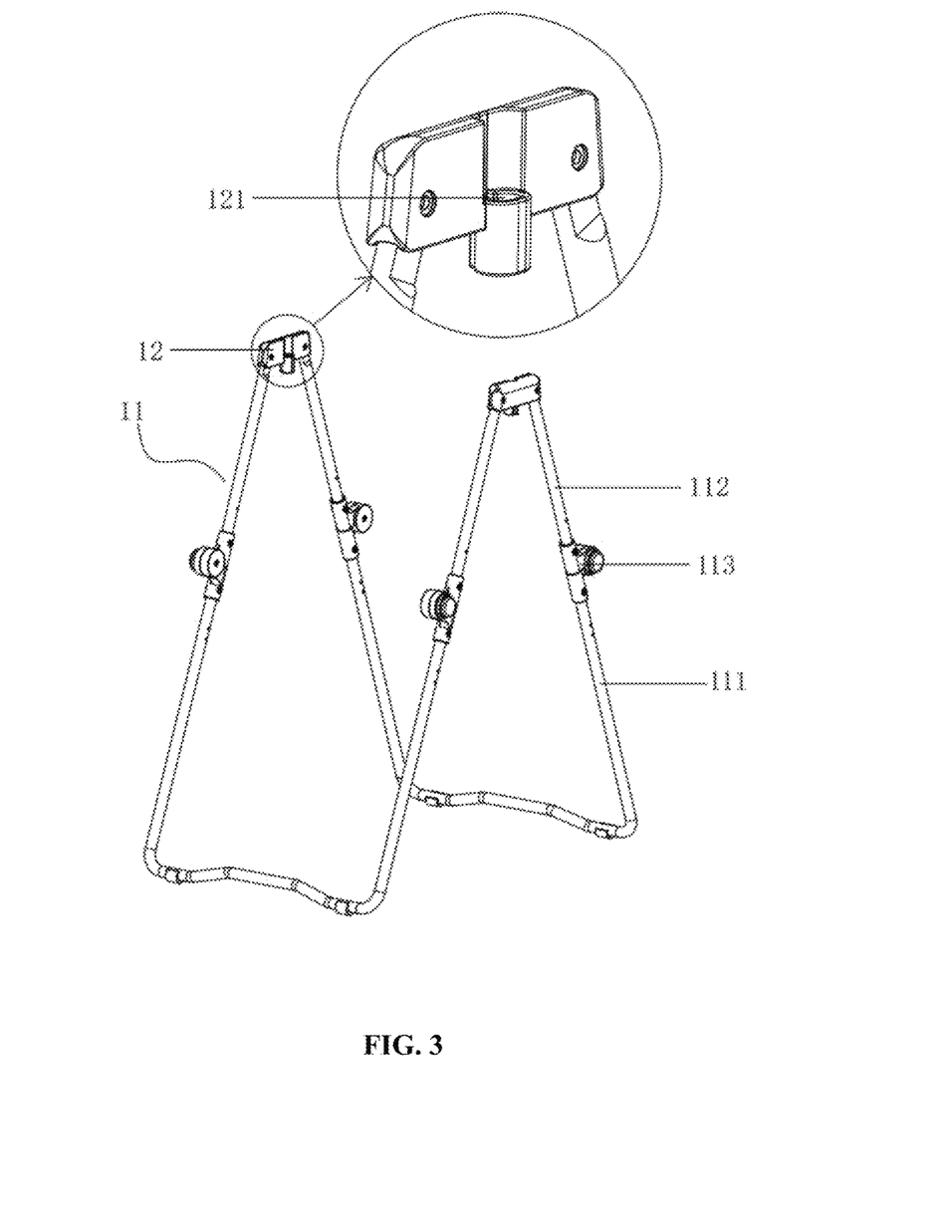
FIG. 3 shows an axial side view of a support component in accordance with some embodiments of the present disclosure.

The support component includes two supporting legs 11 having U-shaped and symmetrically disposed, and two first joint bases 12 for connecting upper ends of the supporting legs 11, and any one of the supporting legs 11 is configured to be rotationally connected to the two joint bases 12. The first joint bases 12 are configured with first through holes 121 for slidingly connecting with the locking rod 52.

The first bracket component 20 includes two support borders 21 symmetrically disposed, and two second joint bases 22 disposed on the two support boarders 21 for connecting them, and any one of the support borders 21 is configured to be rotationally connected to the second joint bases 22. The two support borders 21 form a runway-like structure by means of the two second joint bases 22, to which an upper opening of the flexible bathtub 02 is sewn. When folded, the two support borders 21 are rotated downwards to be close to each other. And when unfolded, the two support borders 21 are held open by means of the locking device 50.

The second bracket component 30 includes two supporting seats 31 symmetrically disposed, and two third joint bases 32 for connecting the two supporting seats 31, and any one of the supporting seats 31 is configured to be rotationally connected to the two third joint bases 32 to fold or open the two supporting seats 31. The supporting seats are formed by combining a number of round tubes to facilitate the placement of the flexible bathtub 02. The third joint bases 32 are configured with second through holes 321 for sliding connection with the locking rod 52. The unfolding and folding principle of the second bracket component 30 is similar to that of the first bracket component 20, and will not be described in detail.

The linkage components 40 includes two linkage rods 41 having X-shaped after being articulated in middle, a fourth joint bases 41 for connecting upper ends of the two linkage rods 41 to the first bracket component 20, and a fifth joint bases 43 for connecting lower ends of the two linkage rods 41 to the second bracket component 30, and the upper ends and lower ends of the linkage rods 41 are configured to be rotationally connected to the fourth joint bases 42 and the fifth joint bases 43, respectively.

Figure 6:
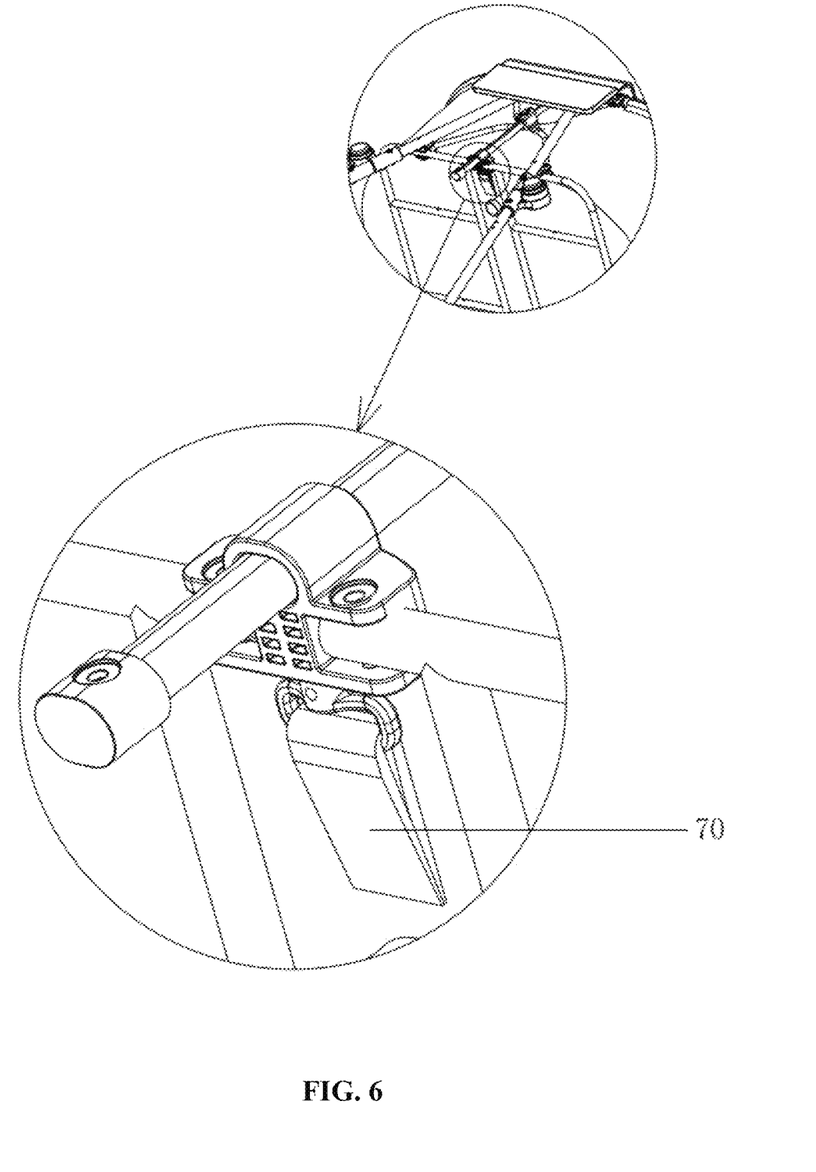
FIG. 6 is a schematic diagram of a bottom fixation of a flexible bathtub in accordance with some embodiments of the present disclosure.

The flexible bathtub 02 is further configured with storage bags 60 on both sides of an upper opening. The flexible bathtub 02 is configured with straps 70 at bottom, and the third joint bases 32 are configured with connectors 322 removably connected to the straps 70. When the flexible bathtub 02 is unfolded, it can be easily secured with straps 70 via the connector 322. Both ends of the straps 70 may be configured with Velcro for quick attachment and detachment. The flexible bathtub 02 is further configured with a drain at the bottom and drains through a spring tube.

The supporting legs 11 have a folding structure, the folding structure includes two feet having a U-shaped 111, two supporting rods 112 for rotatably connected to the feet 111, and a rotation mechanism 113 provided between the feet 111 and the supporting rods 112, the supporting rods 112 are configured to be folded or opened with the feet 111 by the rotation mechanism 113. Specifically, after unfolded, it can be realized to keep an open state by the rotation mechanism 113. And when it is necessary to fold, the rotation mechanism 113 is pressed, the feet 111 can be turned upward and against the supporting rods 112.

The working principle of the folding pet bathtub of the present disclosure is as follows.

Figure 8:
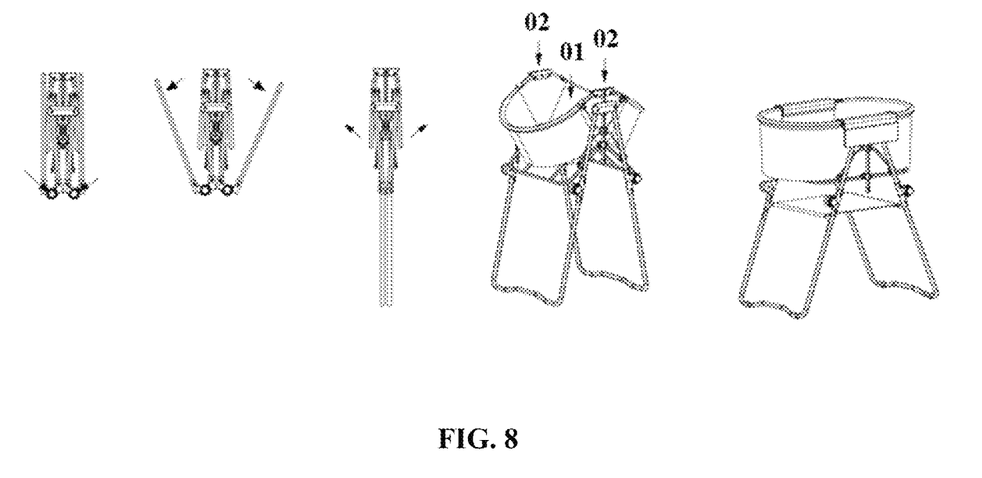
FIG. 8 is a schematic diagram of an unfolding process of the folding pet bathtub in accordance with some embodiments of the present disclosure.

When unfolding, press a button of the rotation mechanism to open the feet and confirm whether it is locked or not, open the support borders 21 upward, press the second joint bases 22 downward and drive the locking rod 52 downward movement. Drive the two supporting seats 31 open by means of the linkage components 40, then until the limit post 531 of the shrapnel 53 reaches a designated position and remains locked, after organize the flexible bathtub 02, then turn the storage bags 60 outwards, and finally plugging of the drain to waterproof.

Figure 9:
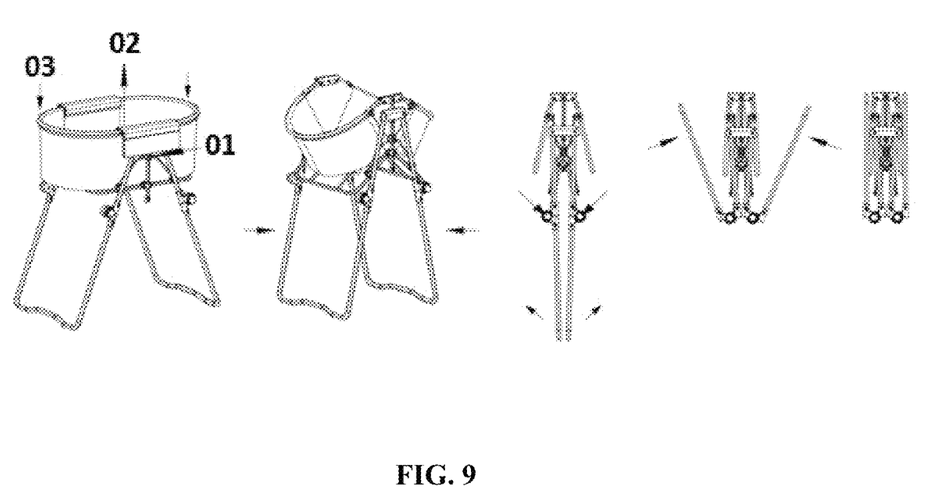
FIG. 9 is a schematic diagram of a folding process of the folding pet bathtub in accordance with some embodiments of the present disclosure.

When folding, first empty the water in the flexible bathtub 02, turn the storage bags 60 inward, press the button 54, and then press the limit post 531 into the limit hole, the two support boarders 21 are pressed downward, driving the locking rod 52 upward movement. Through the linkage components 40 drive the two support seats 31 to fold downward, after folding in place, press the key of the rotation mechanism to realize the folding of the feet, so that the folded pet bathtub has a small volume and does not occupy an area.

In summary, by setting the linkage components to drive the first bracket component and the second bracket component for unfolding or folding, the folding pet bathtub of the present disclosure not only can facilitate daily unfolding and use, but also can reduce the volume of the bathtub by folding the bathtub when it is not in use. Moreover, the folding pet bathtub has a simple structure and is convenient to use.

It is noted that, in this text, all relational terms such as "first" and "second", etc., are used to distinguish one entity or operation from another, and do not necessarily require or imply that any such actual relationship or order between these entities or operations. In addition, the terms "comprising", "comprise", "include", "including" or any other variant thereof, are intended to cover non-exclusive inclusion, so that a process, method, article or apparatus comprising a set of elements includes not only those elements, but also other elements that are not expressly listed, or that are inherent to such process, method, article or apparatus.

Other embodiments of the present disclosure will readily come to mind to the person of ordinary skill in the art upon consideration of the specification and practice of the application disclosed herein. The present disclosure is intended to cover any variations, uses, or adaptations of the present disclosure that follow general principles of the present disclosure and include common knowledge or customary technical means in the art not disclosed herein. The specification and embodiments are to be regarded as exemplary only, and a true scope and spirit of this application is indicated by appended claims.

It should be understood that the present disclosure is not limited to a precise structure that has been described above and illustrated in the accompanying drawings, and that various modifications and changes may be made without departing from its scope. The scope of the present invention is limited only by the appended claims.

What is claimed is:

1. A folding pet bathtub, comprising a foldable support frame and a flexible bathtub provided on the foldable support frame;
   wherein the foldable support frame comprises a support component, a first bracket component and a second bracket component that are foldable and disposed sequentially from top to bottom on an inside of the support component, two sets of linkage components for connecting the first bracket component and the second bracket component, and a locking device disposed on the linkage components for preventing the first bracket component and second bracket component from being folded;
   wherein the locking device comprises a locking seat fixedly provided on the linkage components, a locking rod fixedly provided on the first bracket component and slidingly connected with a locking member, a shrapnel with a limit post provided within the locking rod, and a button provided on the locking seat; wherein the locking rod is configured with a limit hole cooperating with the limit post, the shrapnel is disposed within the locking rod, and the limit post is configured to extend outwardly the locking rod via the limit hole.

2. The folding pet bathtub according to claim 1, wherein the flexible bathtub is further configured with storage bags on both sides of an upper opening.

3. A folding pet bathtub, comprising a foldable support frame and a flexible bathtub provided on the foldable support frame;
   wherein the foldable support frame comprises a support component, a first bracket component and a second bracket component that are foldable and disposed sequentially from top to bottom on an inside of the support component, two sets of linkage components for connecting the first bracket component and the second bracket component, and a locking device disposed on the linkage components for preventing the first bracket component and second bracket component from being folded;
   wherein the second bracket component comprises two supporting seats symmetrically disposed, and two third joint bases for connecting the two supporting seats; wherein any one of the supporting seats is configured to be rotationally connected to the two third joint bases to fold or open the two supporting seats; and,
   wherein the flexible bathtub is configured with straps at bottom, and the third joint bases are configured with connectors removably connected to the straps.

* * * * *